United States Patent [19]
Huang

[11] Patent Number: 5,370,242
[45] Date of Patent: Dec. 6, 1994

[54] MULTI-PURPOSE CD CONTAINER

[76] Inventor: James Huang, P.O. Box 82-144, Taipei, Taiwan, Prov. of China

[21] Appl. No.: 137,750

[22] Filed: Oct. 19, 1993

[51] Int. Cl.⁵ .............................................. H47F 7/00
[52] U.S. Cl. ..................................... 211/40; 206/309; 211/59.4; 211/194
[58] Field of Search ................. 211/40, 41, 59.4, 194, 211/49.1; 312/9.9; 206/309, 387

[56] References Cited

U.S. PATENT DOCUMENTS

| | | | |
|---|---|---|---|
| D. 160,015 | 9/1950 | Rauch et al. | 211/40 X |
| 1,634,699 | 7/1927 | Upjohn | 211/40 X |
| 2,137,737 | 11/1938 | Wenzel | 211/49.1 X |
| 4,850,485 | 7/1989 | Ishikawa | 206/387 |
| 4,978,012 | 12/1990 | Meyers | 211/49.1 |
| 5,188,240 | 2/1993 | Marino et al. | 206/309 X |
| 5,195,642 | 3/1993 | Dardashti | 211/40 X |
| 5,301,819 | 4/1994 | Moeken | 211/40 |

FOREIGN PATENT DOCUMENTS 1362872  4/1964  France ................. 206/309
683831  12/1952  United Kingdom ................. 211/40

Primary Examiner—Robert W. Gibson, Jr.
Attorney, Agent, or Firm—Alfred Lei

[57] ABSTRACT

This invention relates to a multi-purpose CD container and in particular to one including a base having two threaded holes, a plurality of supporting screws joined together to form two supporting rods engaged with the two threaded holes of said base, a lower protection member formed with two tubular members fitted over the two supporting rods, a plurality of frames formed with two tubular members aligned with the tubular members of said lower protection member and fitted over the two supporting rods, an upper protection member formed with two tubular members aligned with the tubular members of said frames and fitted over the two supporting rod, and two bolts inserted into the two tubular members of the upper protection member to engaged with the two supporting rods, whereby the CD container can be adjusted in capacity and used as a lamp for giving light.

3 Claims, 6 Drawing Sheets

MULTI-PURPOSE CD CONTAINER

BACKGROUND OF THE INVENTION

It has been found that the prior art CD container is simply a case with a plurality of slots. However, such a CD container cannot be adjusted in capacity and cannot but used for storing compact discs.

Therefore, it is an object of the present invention to provide a multi-purpose CD container which may obviate and mitigate the above-mentioned drawbacks.

SUMMARY OF THE INVENTION

This invention relates to a multi-purpose CD rack.

It is the primary object of the present invention to provide a multi-purpose CD container which can be adjusted in capacity.

It is another object of the present invention to provide a multi-purpose CD container which can be used as a lamp for giving light.

It is still another object of the present invention to provide a multi-purpose CD container which is simple in construction.

It is still another object of the present invention to provide a multi-purpose CD container which is fit for practical use.

It is a further object of the present invention to provide a multi-purpose CD container which is easy to assemble.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
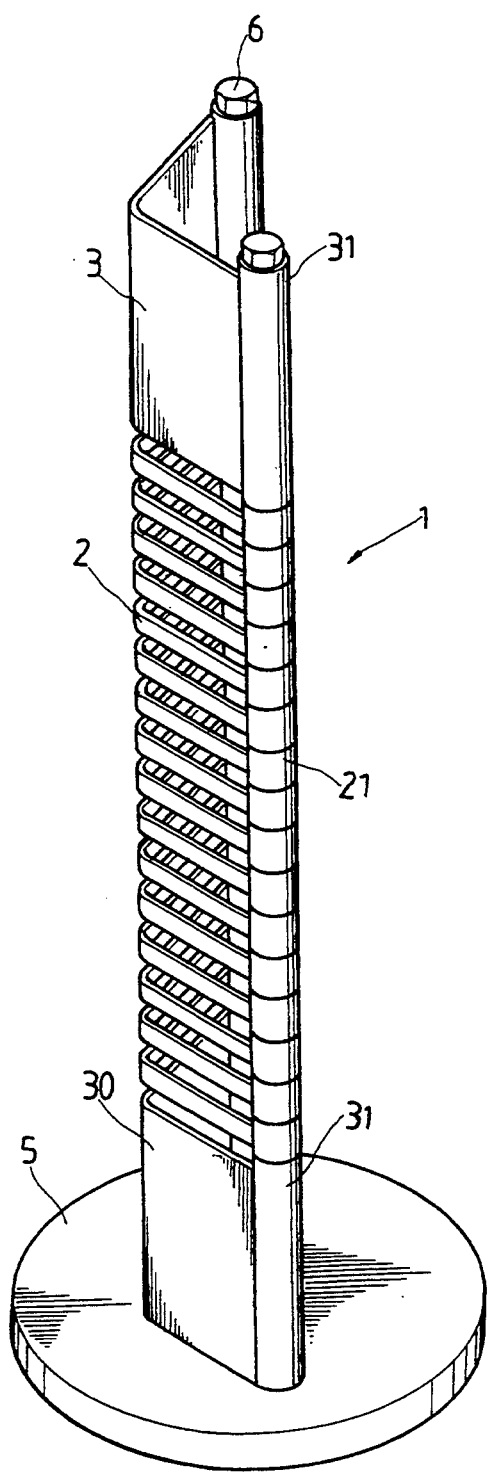
FIG. 1 is a perspective view of a multi-purpose CD container according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
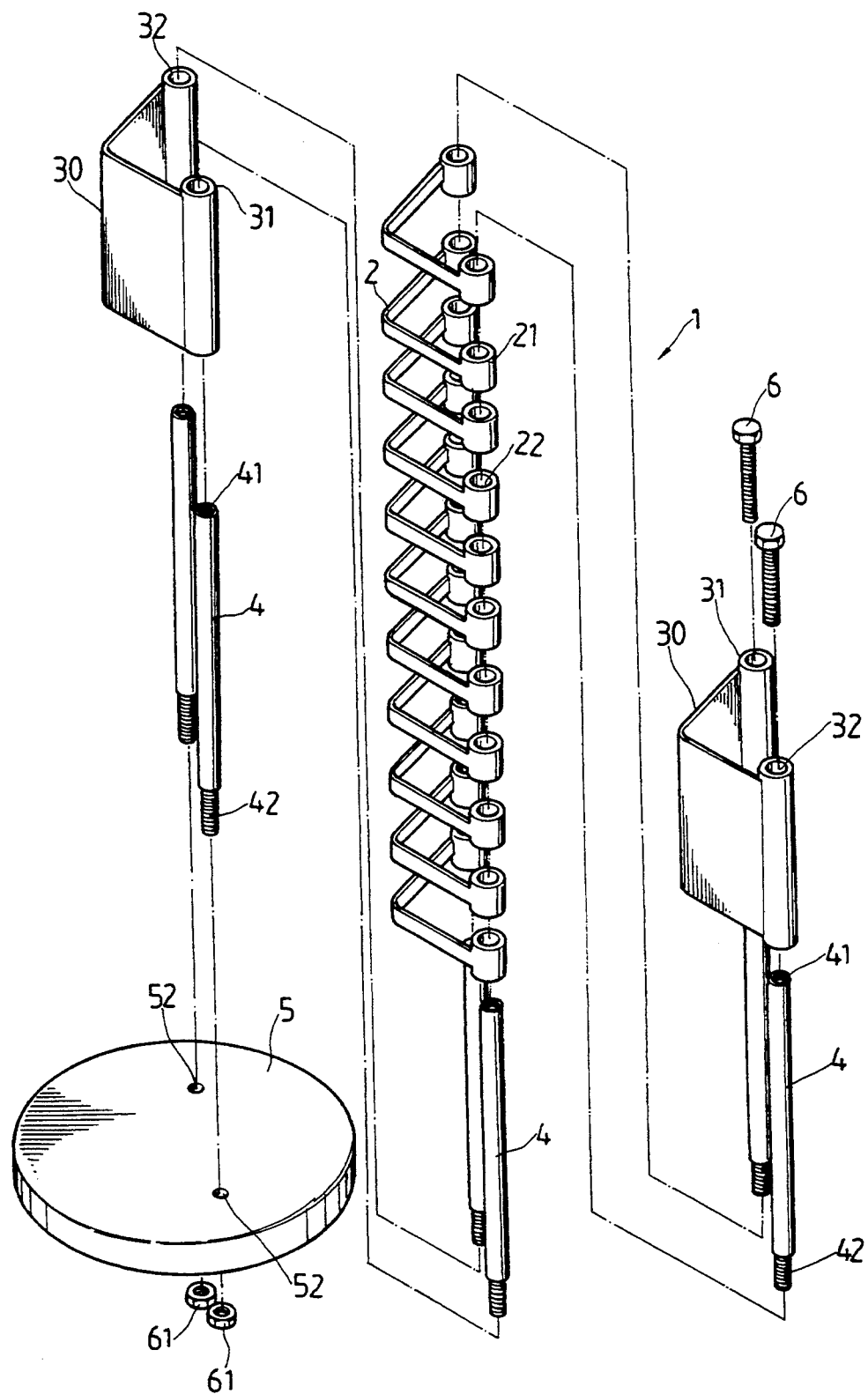
FIG. 2 is an exploded view of the present invention.
Figure 3:
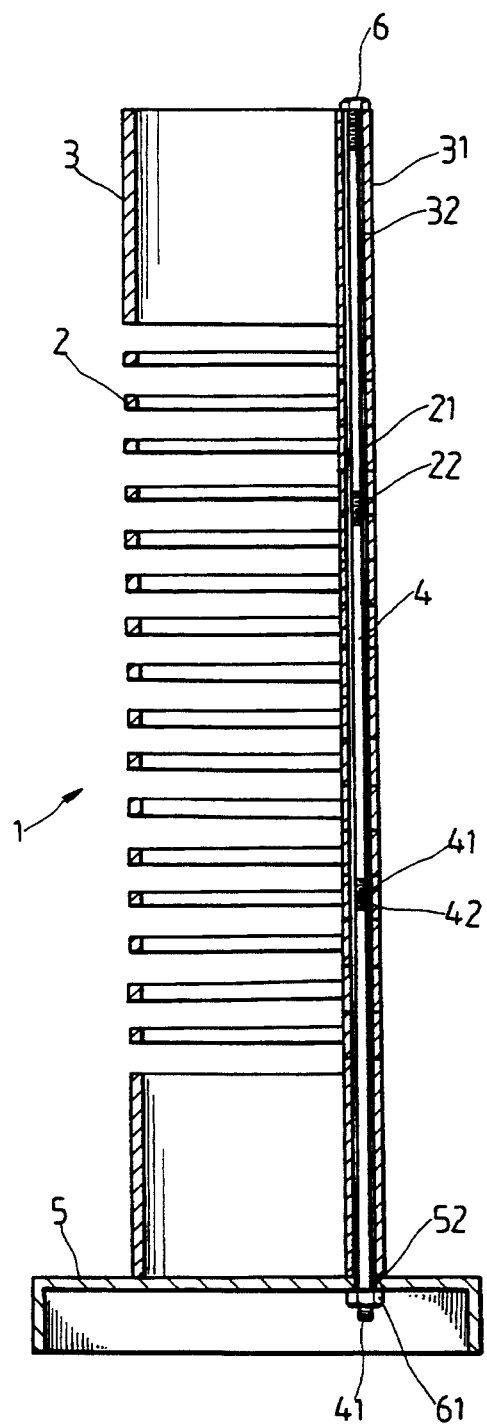
FIG. 3 is a sectional view of the present invention.

With reference to the drawings and in particular to FIGS. 1, 2 and 3 thereof, the multi-purpose CD container 1 according to the present invention mainly comprises a plurality of frames 2, an upper protection member 3, an lower protection member 30, six supporting screws 4, a base 5, two bolts 6 and two nuts 61.

The frame 2 is generally triangular in shape and is formed at two ends with a tubular member 21 having a center hole 22.

The upper protection member 3 is a triangular member which has at two ends with a tubular member 31 having a center hole 32. The upper protection member 3 is mounted on the frame 2, with its two tubular members 31 aligned with the tubular members 21 of the frame 2.

The lower protection member 30 is identical to the upper protection member 3 in structure.

The supporting screw 4 is an elongated member provided with a threaded hole 41 at the upper end and a threaded portion 42 at the lower end.

The base 5 is a circular member formed with two holes 52 the distance between which is just equal to the distance between the two tubular members 31 of the lower protection member 30.

When in assembly, first insert two supporting screws 4 in the hole 52 of the base 5 so that the threaded portions 42 of the two supporting screws 4 extend through the holes 52 of the base. Then engage each of the two supporting screws 4 with a nut 61 so as to fix the two supporting screws in place. Thereafter, engage the threaded portion 42 of a second supporting screw 4 with the threaded hole 41 of each of the two supporting screws 4. Then, engage the threaded portion 42 of a third supporting screw 4 with the threaded hole 42 of the second supporting screw 4. Thereafter, put the lower protection member 30, the frames 2 and the upper protection member 3 on the supporting members 4. Finally, insert two bolts 66 into the two holes 31 of the upper protection member 3 to engage with the threaded holes 41 of the supporting screws 4.

Figure 4:
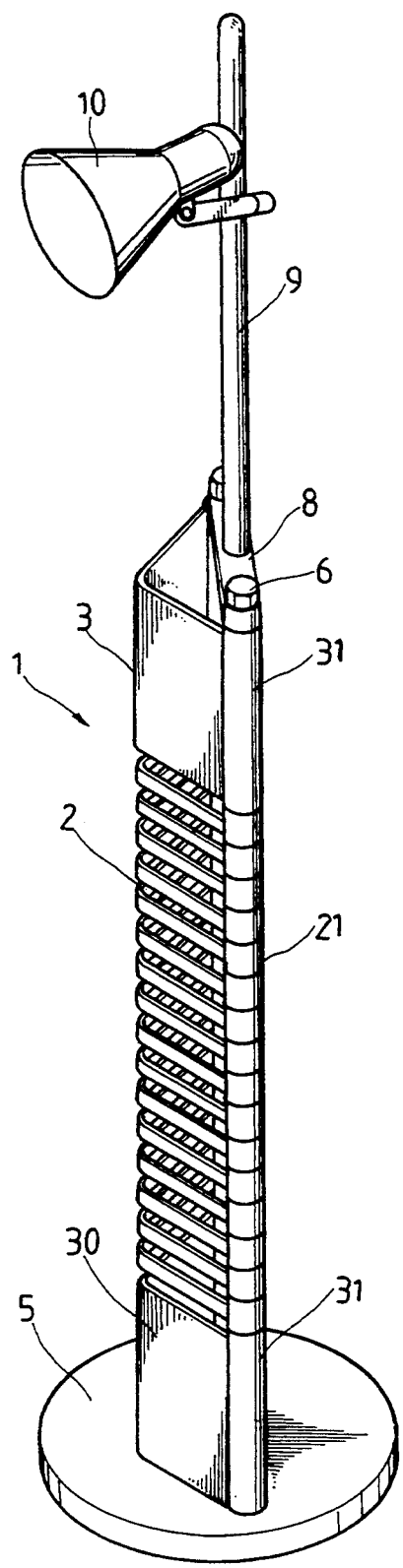
FIG. 4 shows another preferred embodiment of the present invention.

FIG. 4 illustrates a second preferred embodiment of the present invention. As shown, a cross rod 8 is connected between the two bolts 6, on which is mounted a vertical support 9. Then, a lamp 10 is mounted on the vertical support 9.

Figure 5:
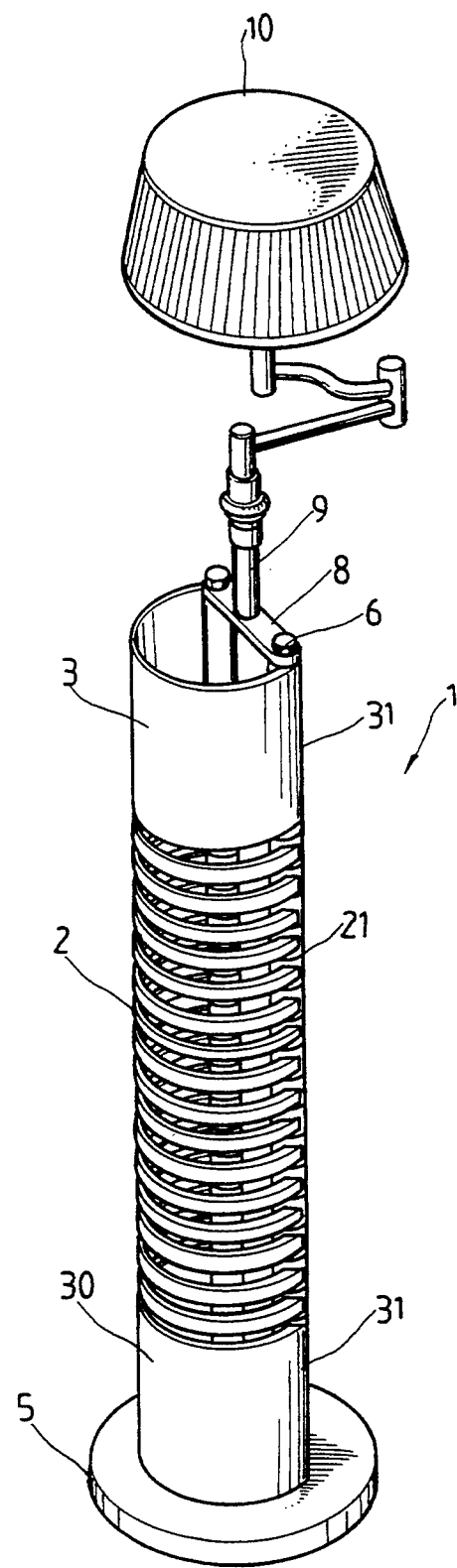
FIG. 5 shows a third preferred embodiment of the present invention.

FIG. 5 shows a third preferred embodiment of the present invention. As may be seen, the upper protection member 31, the frames 2, and the lower protection member 30 are of a cylindrical contour.

Figure 6:
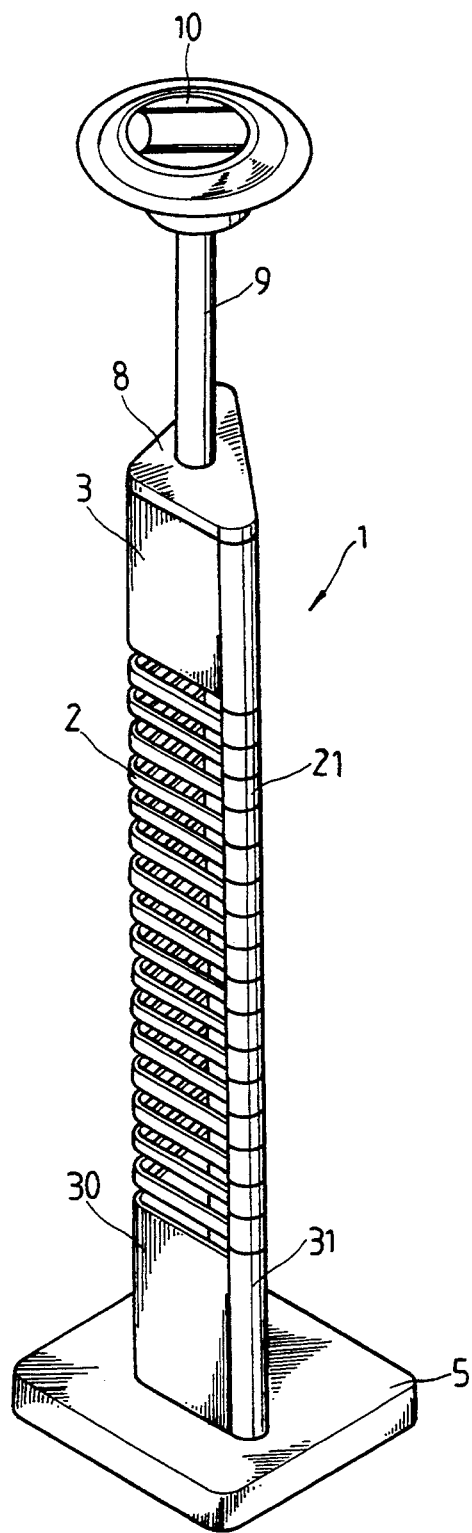
FIG. 6 shows a fourth preferred embodiment of the present invention.

FIG. 6 is a perspective view of a fourth preferred embodiment of the present invention. As illustrated, the base 5 is rectangular in shape.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A multi-purpose CD container comprising:
   a base having two threaded holes;
   a plurality of supporting screws joined together to form two supporting rods engaged with the two threaded holes of said base;
   a lower protection member formed with two tubular members fitted over the two supporting rods;
   a plurality of frames formed with two tubular members aligned with the tubular members of said lower protection member and fitted over the two supporting rods;

an upper protection member formed with two tubular members aligned with the tubular members of said frames and fitted over the two supporting rods; and two bolts inserted into the two tubular members of the upper protection member to engaged with the two supporting rods.

2. The multi-purpose CD container as claimed in claim 1, further comprising a lamp fixedly mounted on said upper protection member.

3. The multi-purpose CD container as claimed in claim 1, wherein said frames may be circular, triangular, etc. in shape.

* * * * *